United States Patent [19]

Russo et al.

[11] Patent Number: 4,593,076
[45] Date of Patent: Jun. 3, 1986

[54] POLYMER OF CAPROLACTAM CONTAINING ELASTOMERIC COPOLYESTERAMIDE HAVING HIGH IMPACT STRENGTH

[75] Inventors: Saverio Russo, Genua; Giovanni C. Alfonso, Serravalle; Antonio Turturro; Enrico Pedemonte, both of Genua, all of Italy

[73] Assignee: ENICHIMICA, S.p.A., Palermo, Italy

[21] Appl. No.: 677,231

[22] Filed: Dec. 3, 1984

[30] Foreign Application Priority Data

Dec. 5, 1983 [IT] Italy .............................. 24022 A/83

[51] Int. Cl.[4] ........................................... C08L 67/00
[52] U.S. Cl. .................................. 525/425; 525/430; 528/323
[58] Field of Search ............... 525/425, 430; 528/323, 528/315

[56] References Cited

U.S. PATENT DOCUMENTS

| | | | |
|---|---|---|---|
| 4,105,640 | 8/1978 | Fortuna et al. | 528/292 |
| 4,115,475 | 9/1978 | Foy et al. | 525/425 |
| 4,252,920 | 2/1981 | Deleens et al. | 525/425 |
| 4,346,024 | 8/1982 | Coquard et al. | 525/425 |
| 4,459,389 | 7/1984 | Mumcu et al. | 525/425 |

FOREIGN PATENT DOCUMENTS 54407 11/1980 Japan .

*Primary Examiner*—Harold D. Anderson
*Attorney, Agent, or Firm*—Hedman, Gibson, Costigan & Hoare

[57] ABSTRACT

Polymers of caprolactam, having high impact strength, obtained by means of anionic polymerization, containing a rubbery phase distributed homogeneously inside the polymer consisting of alternating copolyesteramides with elastomeric properties, and a related production process, comprising dissolving or swelling the elastomeric phase in monomer caprolactam, and submitting the mixture to a polymerization at temperatures variable within the range of from 120° C. to 180° C., in the presence of a basic initiator, and of an activator.

6 Claims, No Drawings

POLYMER OF CAPROLACTAM CONTAINING ELASTOMERIC COPOLYESTERAMIDE HAVING HIGH IMPACT STRENGTH

BACKGROUND OF THE INVENTION

1. Field of the Invention

The object of the present invention are polymers of caprolactam, having high characteristics of impact resistance, containing a rubbery phase homogeneously distributed within the polymers themselves, obtained by means of the anionic polymerization, said rubbery phase consisting of alternating copolyesteramides of the type disclosed in U.S. Pat. No. 4,105,640, dated Aug. 8, 1978 and the related production process.

The process consists of dissolving or swelling the copolyesteramide elastomer inside monomer caprolactam, and submitting such mixture to the polymerization in the presence of a basic initiator, and then of an activator, at temperatures comprised within the range of from 120° to 180° C., optionally directly within the mold (according to the so called RIM, i.e., reaction injection moulding, method), thus obtaining the finished articles.

2. Description of the Prior Art

Polycaprolactam is, as it is well known, an important class of polyamides; it is a thermoplastic material having optimum mechanical and physical characteristics, which allow it to be used, in addition to the production of fibers, also for the production of technical articles.

It is not suitable, however, for the production of items of large dimensions, and for parts requiring a certain degree of flexibility and of impact strength, because of its fragility. Polymers of higher lactams, such as polylauryllactam, show a higher flexibility, and, due to their lower absorption of moisture, a higher dimensional stability. Their characteristics, however, are not such as to allow some uses, especially at low temperatures.

Some copolymers of caprolactam, obtained by anionic polymerization in the presence of new initiators, such as, e.g., copolymers with polyethers and/or polyesters (U.S. Pat. Nos. 3,993,709; 3,944,629; 3,682,262) have been proposed; they show a greater resilience together with a higher moisture absorption. They have, however, the disadvantage of a low thermal stability, which limits their use possibilities.

SUMMARY OF THE INVENTION

It has now been found, and is the object of the present invention, that it is possible to obtain very interesting copolymers of caprolactam, having outstanding physical and mechanical characteristics and much higher impact resistance, by carrying out the anionic polymerization of caprolactam in the presence of a rubbery phase of a particular nature, consisting of alternated copolyesteramides, of the type disclosed in the above-cited patent.

DETAILED DESCRIPTION OF THE INVENTION

The copolyesteramides of this type are thermoplastic elastomers, i.e., in them the characteristics of plastic materials and those of rubbers are contemporaneously present, and hence they can be processed on the equipment intended for plastics, giving end products having elastomeric properties, without requiring the curing normally needed in the case of traditional rubbers.

They consist of a plurality, with statistical distribution, of "elastic" molecular sequences and of "rigid" molecular sequences, linked to each other by ester bonds, such sequences being represented by the following formulae:

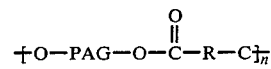 (a)

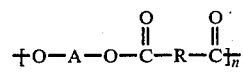 (b)

in which:

PAG is a bivalent radical deriving from polyoxyalkyleneglycols having a molecular weight of from 400 to 3500; A is a bivalent radical of an α,ω-dihydroxyalkane, with a molecular weight lower than 250 (preferably 1,6-hexandiol); R is a bivalent radical of a diesteramide, preferably N,N'-dicarbomethoxybenzoylhexamethylenediamine (6 NT).

In this way, it has been possible to obtain a polymer with higher molecular weight, particularly suitable, even when mold-polymerized, following the RIM system, to give items of large dimensions, such as, e.g., car doors, having excellent impact strength, dimensional stability, tear and tensile strength, also at very low temperatures.

The use is particularly important and critical to the purposes of the present invention, of this type of elastomer in the polymerization of caprolactam.

Whilst indeed this polyesteramide rubber, in all its grades, is suitable to be used in this type of polymerization, other types of rubbers, even being soluble or swelling in caprolactam, have not given appreciable results, or even in some cases have not allowed any polymerization of caprolactam.

So, whilst with nitrile rubber polycaprolactams are obtained having good characteristics, with some types of polyurethanes on polyester base, very low conversion yields have been obtained of caprolactam, and in any case with the achievements of an end polymer very intensely colored; with polyether-base polyurethanes on the contrary a fairly good polymerization has been obtained, but only with rather low contents of the elastomer.

Fluorinated rubbers have even prevented the polymerization of caprolactam, whilst thermoplastic rubbers with styrene-butadiene-styrene blocks have reacted with the initiator, without allowing the subsequent polymerization. Silicone rubbers, acryl rubbers and ethylene-propylene-diene rubbers have been neither dissolved nor swollen in caprolactam, even in low quantities.

According to the quantity of polyesteramide elastomer added, the achievement has been possible of more or less resistant, more or less flexible polymers of caprolactam, however always having the excellent physical and mechanical properties of polycaprolactam as the product obtained has neither the characteristics of a true blend, nor those of a reaction product of caprolactam with the elastomer added, but rather those of a very caprolactam incorporating the dispersed elastomer phase. The quantity of incorporated elastomer, according to the desired characteristics, may vary from 5 to 20% by weight, with optimum results being obtained around 10%.

Before being dissolved in caprolactam, the polyesteramide elastomer is conveniently washed in cold acetone. The purpose of such washing is to remove possible finishing agents, which could influence the polymerization.

After having dissolved or swollen the elastomer in caprolactam (around 120°-140° C.), and after cooling down at a temperature of at least 85° C., the anionic initiator is added; this can consist of: Grignard reactants, alkaline or alkaline earth metals, their hydrides, borohydrides, oxides, hydroxides, organic derivatives, and so on. Preferably sodium, lithium and hydride of lithium are used.

The times needed for the dissolving of the rubbery phase in caprolactam vary as a function of the rubber which is used; for quantities of 5%, a time is needed of about 30 minutes.

The sequence of polymerization processes may take place in different ways, and as one or more step(s).

It is possible as well to dissolve the elastomer in only a portion of the caprolactam to polymerize, adding the initiator to the balance of caprolactam (thus obtaining alkaline caprolactamate) and subsequently carrying out the polymerization by means of the addition of caprolactamate to the monomer/rubber solution, adding the activator and heating up to polymerization temperature, or on the contrary; always adding the elastomer to a portion of the caprolactam to be polymerized, and after having formed the caprolactamate from the balance of caprolactam (by means of heating up to 120° C. for a time of from 10 to 15 minutes; subsequent cooling at 85° C. and addition of lithium hydride or of another initiator and further heating at 110°-120° C. until the complete development of hydrogen), to collect together the two portions of caprolactam (rubber and caprolactamate) inside the polymerization reactor, and after having heated up to the temperature of incipient polymerization (120° C.-180° C.), to add the activator (N-acetylcaprolactam), allowing the polymerization to proceed. The reaction between the initiator and the monomer takes place at a temperature within the range from 85° to 120° C., depending on the initiator used.

In the single-stage process, after the completion of the reaction, i.e., when the development of hydrogen is ended, the polymerization is made to take place in the polymerization reactor, or, if desired, inside the mold, by means of the addition of the activator, holding the temperature within the range from 120° to 200° C.

Activators suitable are the N-acyllactams and related precursors.

The initiator and the activator may be added in quantities comprised between 0.1 and 2% by mole of each with reference to the monomer. In the experimental trials carried out by the applicant, quantities of 0.2% by mole have been used for the initiator, and of 0.6% by mole of the activator.

By suitably varying such quantities, both as for their absolute value, and for their ratios to each other, according to criteria known to those skilled in the art, the average molecular weight, the distribution of molecular weight of the polymers obtained, and the maximum allowable conversion rate may be varied.

The present disclosure is not the right place in which to point out the advantages offered by the Reaction Injection Molding (RIM) system for the production of end articles. The Applicant outlines, however, that the use of caprolactam in this system additionally offers typical advantages over other materials, such as, e.g., polyurethanes, both because of the low viscosity of the product and of the slow increase of the said viscosity during the polymerization, which allow a better control of the production, in that the use of mold release agents is not required, as well as further operations are not necessary for the finishing of the object obtained.

Are therefore the object of the present invention polymers of caprolactam containing a rubbery phase consisting of elastomeric alternate copolyesteramides homogeneously distributed therein, having a value of impact resistance, as measured by ASTM D 256, higher than 100 Joules/meter.

The spirit of the present invention shall be better clarified by the following Examples, and by the Tables in which the properties of obtained polymers are summarized.

All the processes of the Examples reported hereunder have been carried out under a blanket of dry nitrogen.

EXAMPLE 1

5 Parts by weight of alternate polyesteramide rubber have been dissolved in 95 parts by weight of caprolactam. The dissolution took place at a temperature within the range from 100° to 150° C. in about one hour and half.

The system was cooled down to about 85° C. and to it lithium hydride (0.01 parts by weight) was added as initiator. A light brown coloring of the solution was noticed.

The mixture was subsequently heated up to 150° C., and to it N-acetylcaprolactam was added. The polymerization started slowly, but then it became complete in a quite easy way in about 20 minutes.

The polymer obtained showed some lack of homogeneity.

EXAMPLE 2

5 Parts by weight of polyesteramide rubber of the type of Example 1 were dissolved in 72 parts by weight of caprolactam inside the polymerization reactor.

In another reactor, 23 parts of caprolactam were introduced, and heated at 120° C.; the reactor was held at this temperature for about 15 minutes, then it was cooled down to 85° C. and 0.01 parts by weight of lithium hydride were added.

The caprolactam was again heated to 120° C. to make it react with lithium hydride, until the development of hydrogen ended. This second solution was then added to the solution of polyesteramide rubber in caprolactam inside the polymerization reactor, the whole was heated up to 155° C., and the N-acetylcaprolactam was added, allowing the polymerization to proceed for about 30 minutes.

The polymerization took place regularly.

A yield of polymerization of 72% was obtained (the polymerization yield was calculated by removing the residual caprolactam by means of repeated washing in hot water for about 3 hours).

EXAMPLE 3

10 Parts by weight of polyesteramide elastomer of the type used in preceding Examples were dissolved in 65 parts of caprolactam, at 130° C. in a time of about 40 minutes, within a polymerization reactor equipped with stirring means.

In another reactor, 25 parts of caprolactam are heated up to 120° C., and are kept under these conditions for 10 minutes. 0.02 parts by weight of lithium hydride are added thereto, and the mixture is maintained at the temperature mentioned until the development of hydrogen ends.

In the mean time, the polymerization reactor containing the caprolactam/rubber solution was heated up to 155° C., and to it N-acetylcaprolactam was added.

To it the caprolactamate was finally added, and the polymerization was carried on, with continued rubbing of the stirrer, until the viscosity of the system allowed doing so.

A polymerization yield was obtained of 76%, obtaining a light colored clear uniform product.

EXAMPLE 4

5 Parts by weight of polyesteramide elastomer of the type used in Example 1 were dissolved within 72 parts of caprolactamate at 130° C. in about 30 minutes, inside a polymerization reactor equipped with stirrer.

Following the process of Example 3, a solution was prepared of lithium caprolactamate from 0.02 parts of lithium hydride in 23 parts of caprolactam. The process was then carried on as described in Example 3, obtaining a polymerization yield of 75% with the formation of a clear and homogeneous product.

EXAMPLE 5

Polymerizations of caprolactam were carried out in the presence of 15 parts by weight of polyesteramide rubber, following the processes outlined in Examples 2, 3 and 4 (i.e., by subdividing the caprolactam), obtaining a polymerization yield of 76%, a clear and homogeneous product being formed.

EXAMPLE 6

Tests were carried out of caprolactam polymerization according to the processes of Examples 2 and 3, but mixing quantities of polyesteramide rubber greater than 15% by weight.

With quantities of 20% or more, the polymerization rate decreased with a severe reduction of the yield, and with 25% by weight, the polymerization did not occur any longer.

EXAMPLE 7 (COMPARISON EXAMPLE)

The anionic polymerization of caprolactam was carried out, using lithium hydride as the initiator, in the same quantity as used in Example 1.

The initiator was added to caprolactam at a temperature of about 85° C.; the temperature was then raised up to 110° C., to the purpose of forming lithium caprolactamate.

At the end of the reaction (hydrogen bubble development ended) the heating was restored up to about 140° C., the activator (N-acetylcaprolactam) was then added, in the same proportions as in Example 1, and the polymerization was carried on for about 20 minutes.

Other tests were carried out under the same conditions, but varying the polymerization temperature between 120° and 155° C.

Appreciable differences were not observed in the polymers obtained at different temperatures.

EXAMPLE 8

Tests were carried out of caprolactam polymerization with polyester-base polyurethanes of the aliphatic or of the aromatic types, following the process shown in Example 1, with different quantities of polyurethane elastomers.

Before the polymerization, the polyurethanes were washed with acetone.

Aliphatic polyurethanes are dissolved with more difficulty than aromatic polyurethanes; they require therefore quite high temperatures.

The incipient polymerization temperature in both test series was of about 155° C.

With the 5% by weight of polyurethanes, the polymerization yields are moderate (around 50%), a product being formed of deep yellow-brown colour.

With 10 times as higher quantities of the initiator, yields up to 70% were obtained.

Increasing the quantity of the polyurethane (around 9% by weight), with an initiator quantity equal to that used without the addition of polyurethane, the polymerization does not occur. In order to obtain the polymerization, the quantity of the initiator must be increased up to 25 times as normal quantity, and but the polymerization yields are very low, i.e., of from 25% to 30%.

The activity was checked of metallic sodium as the initiator, but a product was always obtained with a deep yellow-brown color, and in very low yields (of about 20%).

EXAMPLE 9

Polymerization tests were carried out in the presence of polyether-base polyurethane rubbers.

Polyurethanes were preliminarly washed in cold acetone.

With reduced quantities of elastomer (5%), operating as described in Example 2, with the polymerization being started at 150° C., a fair polymerization yield was obtained (70%).

Increasing the quantity of polyurethane elastomer, the polymerization times increase, and the yields are, however, severely reduced (to about 30%).

Samples from the products obtained as described in preceding Examples were submitted to melting temperature determination tests (by calorimetric methods) and to glass transition temperature tests (samples annealed at 80° C. for 24 hours), as well as to the determination tests of mechanical characteristics by means of stress-strain and impact strength tests.

The data pertaining to the products obtained in the Examples are collected in the Tables attached (Tables 1, 2 and 3).

From them, the improved impact strength is clear of the polycaprolactam containing the polyesteramide elastomer, in particular containing about 10% of elastomer, the other mechanical characteristics being unaffected.

TABLE 1

Melting (Tf) and glass transition (Tg) temperatures (°C.)

| Polymer of Example No. | Tf | Tg |
|---|---|---|
| 7 | 217 | 52 |
| 2 & 4 | 220 | 48 |
| 3 | 222 | 49 |
| 5 | 218 | 47 |
| 9 | 214 | 37/40 |

TABLE 2

Mechanical Properties

| Product of Example No. | Elastic modulus (GPa) | Tensile strength (MPa) | Yield strength (MPa) | Yield Elongation (%) |
|---|---|---|---|---|
| 7 | 1,7 | 61 | 60 | 5–6 |

TABLE 2-continued

| Product of Example No. | Mechanical Properties | | | |
|---|---|---|---|---|
| | Elastic modulus (GPa) | Tensile strength (MPa) | Yield strength (MPa) | Yield Elongation (%) |
| 2 & 4 | 1,6 | 49 | 52 | 5 |
| 3 | 1,4 | 54 | 55 | 5-6 |
| 5 | 1,4 | 50 | 54 | 5 |
| 9 | 1,2 | 50 | | nearly negligible |

The data refer to washed specimen, i.e., from which the unreacted caprolactam and the low molecular weight products had been removed, molded at 210°-220° C. under vacuum for 1 hour and conditioned within a $P_2O_5$-drier for at least one day.

The tests were carried out by means of an Instron 1122 dynamometer. The tests were carried out according to ASTM D 638.

TABLE 3

| Product of Example No. | Impact Strength — Impact strength, Joules/meter. Measured by the Izod method with notch, on cut specimens 0.76 cm² in section (0.6 cm × 1.27 cm), with 2.5 mm notch at the angle of 45° |
|---|---|
| 7 | 92 |
| 2 & 4 | 150 |
| 3 | 196 |
| 5 | 170 |
| 9 | 60 |

(Average values on 10 non-conditioned specimens at room temperature). The tests were carried out by the ASTM D 256 method.

We claim:

1. A process for preparing a polymer of caprolactam containing a rubbery phase consisting of an elastomeric copolyesteramide homogeneously distributed within the polymer at the content within the range from 5 to 20% by weight, in which the copolyesteramide consists of a plurality of elastic molecular sequences alternating with rigid molecular sequences linked to each other by ester bonds, said process comprising:
   (a) dissolving the copolyesteramide elastomer in all or a portion of the caprolactam monomer to form a solution, and
   (b) polymerizing said solution of copolyesteramide elastomer and the balance of any undissolved caprolactam monomer in the presence of a basic initiator and a polymerization activator.

2. A process as claimed in claim 1, in which the basic initiator is selected from the group consisting of metallic sodium and lithium hydroxide, and the polymerization activator consists of N-acetylcaprolactam.

3. A process as claimed in claims 1 or 2, in which the initiator and the activator are added in quantities within the range from 0.1 to 2% by mole of each one, relative to the monomer caprolactam.

4. A process as claimed in claims 1, 2, or 3, in which the initiator is added in the quantity of 0.2% by mole, and the activator is added in the quantity of 0.6% by mole relative to the caprolactam monomer.

5. A polymer of caprolactam containing a rubbery phase consisting of an elastomeric copolyesteramide homogeneously distributed therein, in which the copolyesteramide consists of a plurality of elastic molecular sequences alternating with rigid molecular sequences linked to each other by ester bonds, such sequences being represented by the formulae

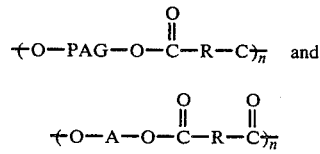

where PAG is a bivalent radical derived from a polyoxyalkyleneglycol having a molecular weight from 400 to 3500, A is a bivalent radical of an α,ω-dihydroxyalkane having a molecular weight below 250, and R is a bivalent radical of a diesteramide, said caprolactam polymer having been formed by dissolving a copolyesteramide elastomer in all or a portion of the caprolactam monomer and polymerizing the resulting solution or a mixture of the resulting solution and any undissolved caprolactam monomer at a temperature in the range from 120° to 180° C., in the presence of a basic initiator consisting of lithium hydroxide and a polymerization activator consisting of N-acetylcaprolactam, the resulting caprolactam polymer being characterized by an impact strength higher than 100 Joules per meter.

6. An article which has been prepared from a caprolactam polymer as claimed in claim 5.

* * * * *